INVENTOR.
RICHARD G. LEE
BY
ATTORNEYS

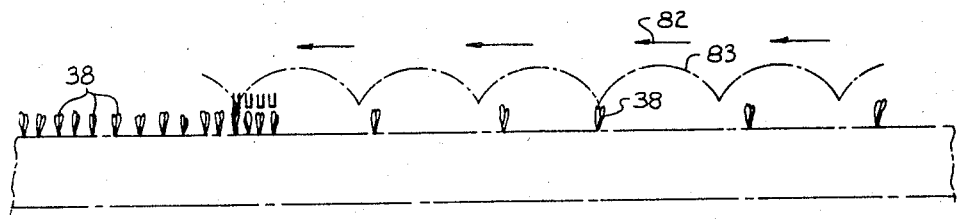
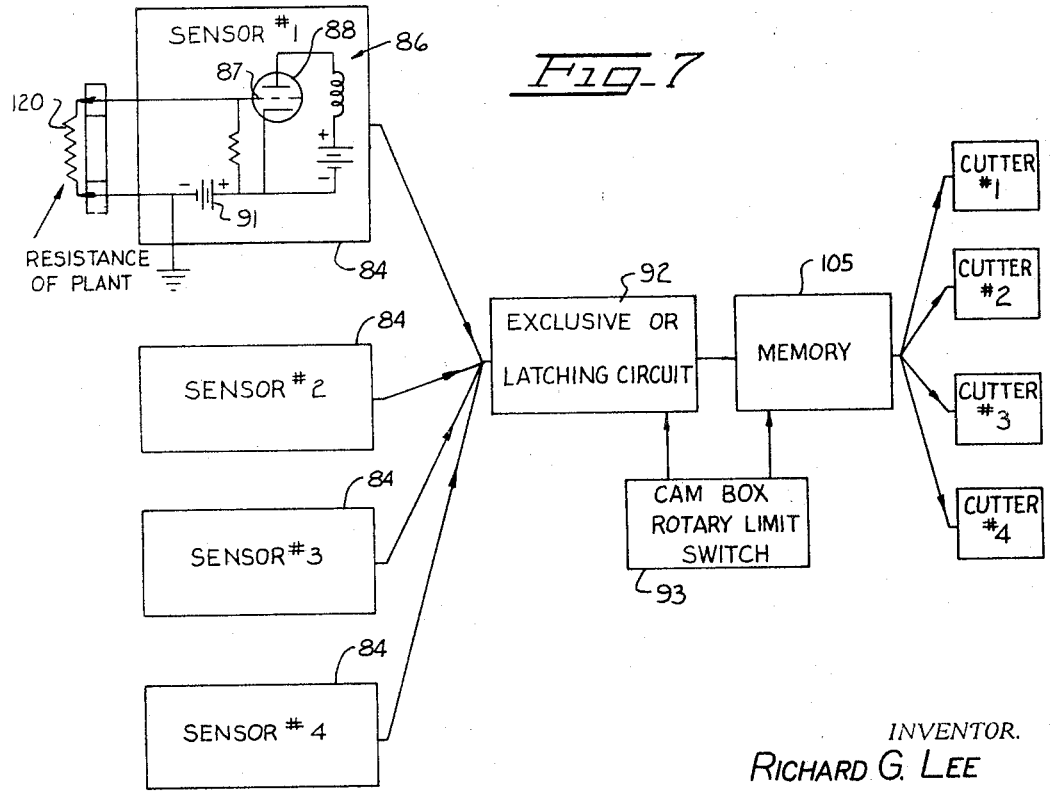

United States Patent Office 3,439,746
Patented Apr. 22, 1969

3,439,746
METHOD AND APPARATUS FOR SELECTING PLANTS OF A CROP FOR HARVEST
Richard G. Lee, Carmel Valley, Calif., assignor to The Tensor Corporation, Monterey, Calif., a corporation of California
Filed Jan. 17, 1966, Ser. No. 521,086
Int. Cl. A01b *41/02, 41/06*
U.S. Cl. 172—1                                    24 Claims

ABSTRACT OF THE DISCLOSURE

A method and apparatus for selecting plants of a crop is described which automatically compares the plants to one another to determine the superior plants for harvesting or thinning of the crop. Plant quality sensing probes are advanced linearly along a row of the crop while simultaneously being moved through a circular path to impart to them a cycloidal motion. The plants of successive groups of plants are contacted with the probes when their direction of movement in the circular is opposite to the direction of advancement along the row so that the relative movement between the probes and the plants is minimized during the sensing.

The present invention relates generally to a technique for detecting superior plants of an established crop. More particularly, it relates to a method and apparatus wherein the superior plants are selected for harvesting by contacting plants of the crop to comparatively measure a selected characteristic of the plants.

Improvements in agricultural techniques constantly are being sought because substantial benefits can be realized by the society being supported by the resultant advanced agricultural industry. For example, by controlling a crop whereby the inferior plants are weeded out and the superior plants allowed to mature for harvesting, waste can be minimized. By minimizing waste, the yield of the land will be enhanced. Of course, with enhanced land yield, a parcel of land is able to support more people, hence less land is required to supply the foodstuffs for the society. Moreover, if the weeding out process is properly mechanized, the percentage of the labor force required by agriculture can be reduced.

In addition, a considerably better quality product also can be realized by the weeding out process. The improved quality gained is attributed to the fact that the somewhat retarding influence that inferior plants have on the development of the proximate superior plants is suppressed by weeding out the more inferior plants. This is a particularly important factor to take into consideration when plants are growing close together.

In farming some crops, particularly the vegetable crops, the young plants often are found to be growing too close together. In most cases, this improper plant spacing is created by the sowing technique commonly employed, i.e., overseeding the area to be planted to insure that the optimum plant density for the land is attained. Consequently, to insure that the optimum plant density is maintained, such a crop must be thinned. If a crop must be thinned, obviously it would be preferred to select the inferior plants for removal.

Heretofore selective crop thinning and plant selection generally has been accomplished by manual labor, particularly in those cases where delicate vegetable type crops, such as lettuce, are farmed. As is well known to those acquainted with agriculture, manual farming is expensive and slow, more so where large crops must be cared for. Although there have been recent advancements towards mechanized farming, the techniques and equipment presently employed to selectively thin delicate vegetable type crops have proven to be seriously inadequate for a variety of reasons. Such techniques generally employ a plant feeling mechanism which grasps the individual plants to determine their quality. In many cases such grasping causes damage to plants which otherwise would have been high quality plants. Because the grasping must be delicately accomplished, the machinery conveying the plant grasping apparatus is stopped each time a plant quality check is to be made. Although such techniques are superior in comparison to manual crop thinning processes, the time required for thinning crops could be reduced if the periodic movement of the conveyor could be converted to continuous movement. The time saving that would be realized as a result of such a conversion would result in a substantial savings in the expense of farming.

The present invention is a method and apparatus for carrying out the steps thereof which is capable of selecting with minimum plant contact higher quality or superior plants of a crop for subsequent harvesting. The method and apparatus of the present invention capitalizes on the fact that the superior quality plants of a crop generally are the largest. Hence, by determining the size, for example, by measuring plant height or width, the more superior plants of a crop can be distinguished from the more inferior ones. Alternatively, the electrical plant resistance or plant capacitance could be measured since these characteristics vary proportionally to the quality of the plant. Generally, plant resistance is a more accurate representation of the plant quality since in some cases a larger plant may be of inferior quality. However, in all of the cases noted above, the quality of the plant can be determined by an instantaneous or momentary contact of the plant.

In the method of the present invention, selected plants of a crop are momentarily contacted to generate in response to the plant contact a signal representative of the quality of the contacted plant. If the height or width of the plant is to be employed as an indication of its quality, the representative signal may be initiated by a pressure sensitive switch contacting the plant and being activated thereby. Alternatively, a conductive probe with spaced insulated apart tips contacting the plant to complete a relay activating circuit could be employed. If the plant's electrical characteristic is employed to indicate the plant's quality, a suitable conductive probe could be employed to measure the resistance of the plant and initiate the generation of a signal representative of the electrical characteristic.

The signal representative of the plant's quality is compared to a standard representative of a certain plant quality level. The standard may be provided by comparing a plurality of simultaneously initiated plant quality representative signals to ascertain which signal from the plurality of generated signals represent the plant of the contacted plants which has a superior quality. Alternatively, a fixed standard may be provided which compares each signal generated to determine which plants contacted have a quality exceeding that set by the fixed standard. Such a fixed standard could be, for example, a switching circuit which responds to the first probe-plant contact by generating a signal indicative of the probe which made the first plant contact.

As can be seen from the above, the steps of the method of the present invention may be accomplished in a variety of ways. Furthermore, as will become more apparent from the following, the steps of the method of the present invention lend themselves to either an automatic continuously conducted operation or an intermittently conducted operation for either harvesting or crop thinning operations. Such intermittent operation may be accomplished by manually tagging the plants determined to have a superior quality and subsequently harvesting those plants or extracting those untagged plants of inferior quality. In the case where an automatic continuously conducted operation is desired, the plants of selected quality, either inferior or superior, are extracted in response to the comparison. In crop thinning, the plants of inferior quality would be extracted.

The present invention also provides apparatus for conducting the steps of the foregoing method in an automatic continuous sequence. More particularly, the apparatus of the present invention comprises a mobile carriage to which is mounted at least one plant sensing means including a probe. Each probe is mounted to be moved through a defined path as the carriage is advanced and to contact a plant of the crop when at a selected location in the defined path. The plant sensing means responds to each probe plant contact by generating a signal representative of the quality of the contacted plant.

In one embodiment, the probes are moved through a circular path in a plane parallel to the direction of carriage advancement and at an angular velocity synchronously related to the speed at which the carriage is advanced. Depending upon the relationship of the angular and linear velocities, the probe's plant contact points will follow various cycloidal paths. For example where the speed of advance of the carriages is adjusted to be equal to the product of the radius of the circular path defined by the probe's plant contact points and the angular velocity of the probes, i.e., $V=R\omega$, the path will be a perfect cycloid. Where the ratio of $V/\omega$ is less than R, the path will be a prolate cycloid. Where the ratio of $V/\omega$ is greater than R, the path will be a curtate cycloid. In each of these cases, there will be one location along the path traveled by the probes where the direction of movement of the probes will be exactly in a direction opposite to that of the carriage. Hence, relative to a stationary point off the carriage the probes will pause. It is at this location on the circular path traveled by the probes where it is preferred to effect plant contact. By so arranging the apparatus, relative movement between the probes and plants is minimized while the carriage is maintained in continuous motion. Hence, the possibility of the plants being damaged by the probes is negligible while the time required to, for example, thin a crop is less relative to those methods commonly employed in the art.

The apparatus of the present invention further comprises a plant extracting means which is responsive to selected signals generated by said plant sensing means to extract selected plants. For crop thinning, it has been found to be particularly expedient to employ a piston actuated blade associated with each probe to scrape the selected plants out of the ground, with the pistons timed to automatically operate the blade just subsequent to each plant contact operation. In such an embodiment, the signal representative of the superior quality plant is employed to inhibit the operation of the piston associated with the probe contacting the plant of superior quality.

Accordingly, it is an object of the present invention to provide a plant selection method and apparatus which accomplishes the selection without damaging the plants of the crop.

More particularly, it is an object of this invention to provide a method and apparatus wherein superior plants of a crop are selected for harvest in a minimum of time.

It is a further object of this invention to provide a method of thinning inferior plants from a crop which can be performed by machine means.

A further object of this invention is to provide a mechanized plant extracting apparatus wherein the plants to be extracted from a crop are selected by momentarily contacting the plants of the crop.

Still a further object of this invention is to provide a mechanized plant extracting apparatus wherein the plants to be extracted from a crop are selected by plant contacting means directed to momentarily pause when engaging the plants of the crop.

It is yet another object of this invention to provide the above noted momentary pause by directing said plant contacting means through a cycloidal type path.

Another object of this invention is to provide a mechanized crop thinner capable of simultaneously thinning plants arranged in a plurality of spaced rows.

Yet another object of this invention is to detect superior plants of a crop for harvesting by comparatively measuring the resistance of selected groups of plants of the crop.

Still another object of this invention is to detect superior plants of a crop for harvesting by measuring the size of the plants of the crop.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 6 illustrates the path followed by the probes of the plant sensing means.

FIGURE 7 is a block diagram drawing of one control circuit embodiment for controlling the operation of the four-row crop thinner embodiment.

Figure 1:
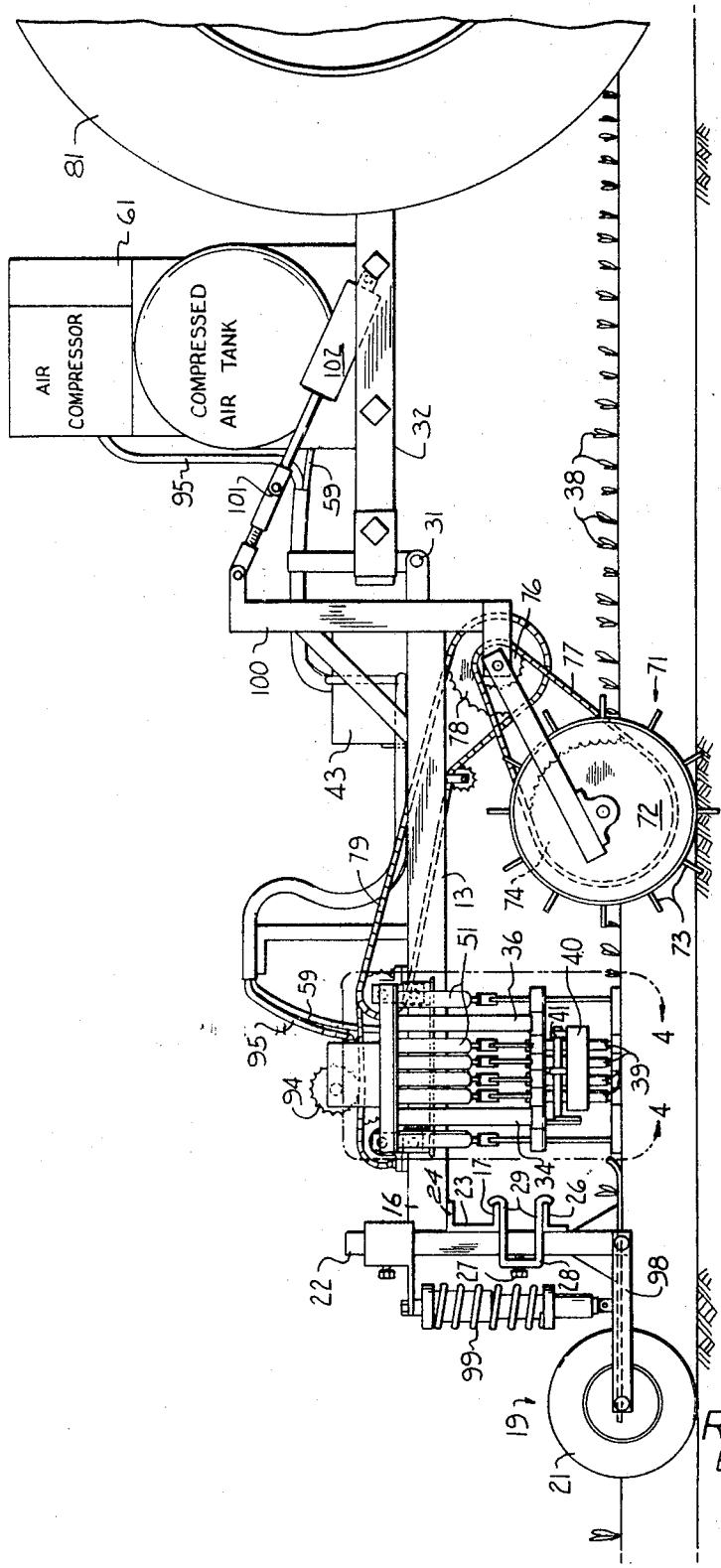
FIGURE 1 is a side elevation view of a row crop thinner embodiment of the present invention adapted to thin simultaneously four rows of plants.

In conducting the method of the present invention to select superior plants of a crop arranged in spaced apart rows, a plant sensor is directed to momentarily make point contact with selected plants. More than one plant sensor may be employed in conducting the method of the present invention if desired. In such cases, the sensors may be directed to randomly sample the plants of the crop, for example, where the crop comprises numerous closely spaced plants. Conversely, each plant of the crop can be contacted by spacing the plant sensors in accordance with the plant separation of the crop and directing the sensors to contact in sequence adjacent groups of plants. In addition where a plurality of plant sensors are employed, they may be operated to contact plants sequentially or simultaneously.

In each of the cases set forth above, a signal is generated in response to a plant contact which is representative of the quality of the plant contacted. In one preferred method, the size of the plants is measured and a signal generated representative of the plant's size. One technique for accomplishing this size related signal generation will be explained in detail infra as employed by the apparatus of the present invention.

The plant quality related signal or signals generated are compared to a standard representative of a selected plant quality level desired. Such comparison may be accomplished by employing a fixed standard. However, in some cases it may be desired to establish a standard for each time plants are sensed. This has been found to be particularly advantageous where the method of the present invention is employed to thin a crop. In those cases, a selected group of plants of the crop are sensed simultaneously, and plant quality signals generated for each plant. The standard is established for the particular plant group selected by comparing the generated plant quality signals to one another to generate an output indicative of the plant selected from the plant group as being of superior quality.

The particular plants selected for removal or extraction from the crop depend upon the purpose for which the method of the present invention is conducted. In crop thinning, the inferior plants are weeded out from the superior plants. Hence, in response to the plant quality signal comparison, the identified inferior plants are extracted from the crop bed and the identified superior plants left for subsequent harvesting. On the other hand, if it is desired to extract the superior plants from the crop, the response of the plant quality signal comparison can be employed to initiate the extraction of only the superior plants.

The method of the present invention will offer even further advantages where steps thereof can be conducted by a single machine operated device. Such operation offers all of the advantages which characterize mechanized farming. To mechanistically carry out the steps of the method of the present invention, a unique apparatus is provided. One embodiment of such apparatus employed to selectively extract plants to thin a row crop is illustrated in the figures.

Figure 2:
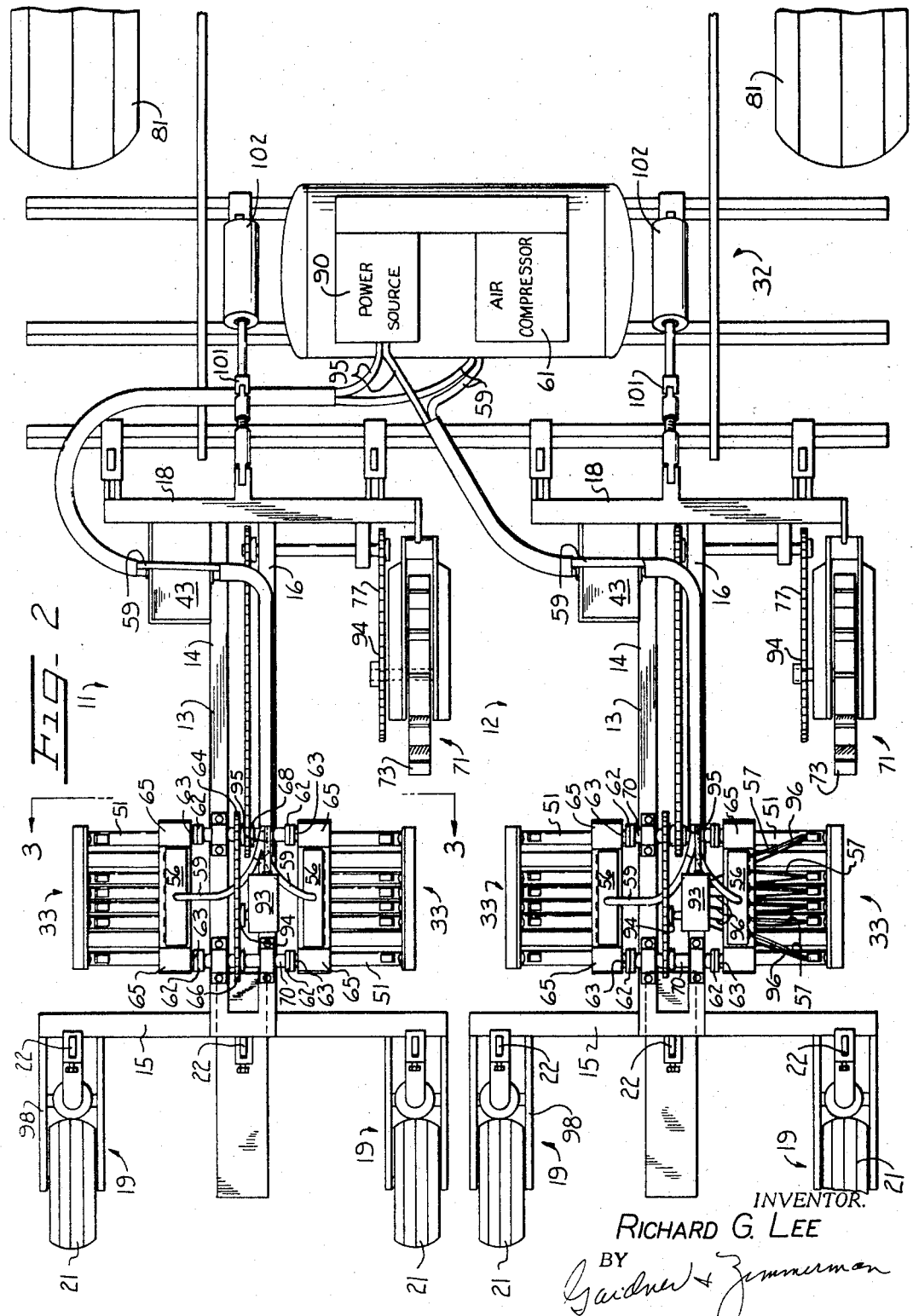
FIGURE 2 is a plan view of the embodiment of FIGURE 1.
Figure 3:
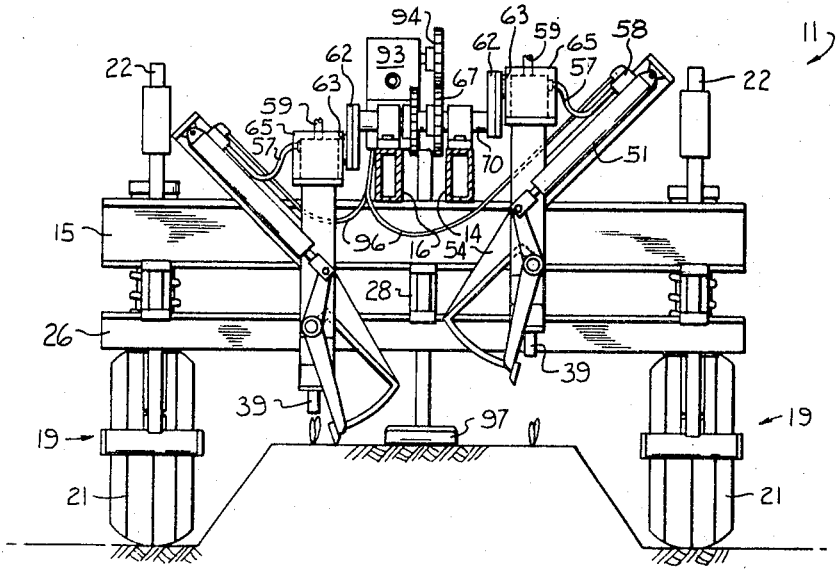
FIGURE 3 is a cross section taken at lines 3—3 of FIGURE 2.

Referring first to FIGURES 1–3, the apparatus of the present invention comprises first and second mobile carriages 11 and 12 respectively. Although two carriages are shown, any number of carriages may be linked together or only one carriage may be employed. Generally, but not necessarily, each mobile carriage will be a duplicate of the others. Considering the mobile carriage embodiment illustrated in the figures, it is seen that each carriage comprises an I-shaped support frame 13 including two horizontally spaced apart stems 14 and 16 secured between first and second cross members 15 and 18. The stems and cross members are constructed from conventional structural materials such as rectangular tubing welded together. At each end of cross member 15 is mounted a wheel assembly 19 to render the carriage mobile. The wheel assembly 19 includes a wheel 21 suspended from the cross member 15 by a suspension bar 22.

To facilitate adjusting the vertical position of support frame 13 relative to wheel 21, a U-shaped channel type cross member 17 is employed with its web 23 positioned adjacent suspension bar 22. U-shaped cross member 17 is fastened to stems 14 and 16 by welding one of its extensions 24 thereto. An L-shaped member 26 is fastened by welding between wheel suspension bars 22 spaced below U-shaped cross member 17. Each suspension bar 22 is vertically adjustably mounted to the I-shaped frame 13 by a set screw 27 and a U-shaped grip 28. The U-shaped grip 28 is positioned with its arm 29 extending between U-shaped and L-shaped members 17 and 26 respectively. The extended end of the arms 29 are curved to grip the members 17 and 26. The arms 29 of grip 28 are apertured to allow bar 22 to slidably pass therethrough. The I-shaped frame 13 is fixed relative to wheel 21 by adjusting set screw 27 to clamp bar 22 against members 17 and 26. The I-shaped frame 13 of each carriage 11 and 12 is allowed to be vertically adjusted by pivotally coupling cross member 18 of each carriage by hinges 31 to a fixed frame 32. The elevation of I-shaped frame 13 is adjusted in accordance with the height of the plants of the crop. It is noted that each of the I-shaped frames 13 of the linked carriages can be positioned at different elevations. This is particularly important where the rows of plants being thinned vary in elevation or where the plants of different rows are of different sizes.

Figure 4:
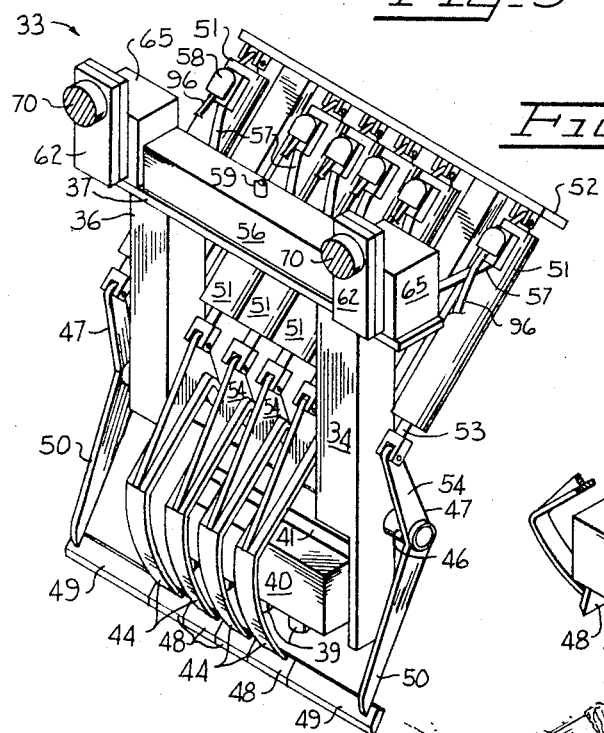
FIGURE 4 is a perspective view delineated by lines 4—4 of FIGURE 1 portraying the plant sensing and extracting assembly employed in the four-row crop thinner embodiment.

Considering now a preferred plant sensing and extracting means assembly 33, attention is directed to FIGURES 1–4 and in particular, FIGURE 4. Assembly 33 comprises a frame including first and second spaced apart members 34 and 36 extending from a main support member 37. To facilitate measuring the quality of plants 38 of a crop, a plurality of spaced apart probes 39 (four shown) are mounted to a container 40 between the ends of members 34 and 36 distal main support member 37. Container 40 is mounted by bar 41 to member 34 and houses wires leading from probes 39 to a multiconductor cable 42 (see FIGURE 5). Cable 42 electrically couples probes 39 to a control circuit for controlling the plant extraction operation housed in chassis container 43 mounted on I-shaped frame 13. A preferred plant extraction control circuit will be explained in detail infra.

Plant extraction is accomplished by journally mounting a plurality, like in number as there are probes, of bell crank-like levers, each including one curved arm 44, to a pivot rod 46. The pivot rod is mounted between and extends through the spaced apart members 34 and 36 immediately above container 40. The arms 44 are curved so that they do not contact container 40 as they are pivoted about rod 46. At each end of pivot rod 46 extending through members 34 and 36 is journally mounted a bell crank lever 47. At the end of each curved arm 44 distal pivot rod 46 is mounted a blade 48 for extracting any plane contacted thereby as the arm 44 is pivoted. Preferably, the blades 48 are positioned to be centered in the same vertical plane as the probes 39 when engaging plants to be extracted. To insure the removal of all the plants selected to be extracted, the length of each blade 48 is extended so that the adjacent edges of adjacent blades 48 just clear one another.

Each bell crank lever 47 is also provided with a blade 49 at the end of the arm 50 proximate blades 48. In order that proper plant selection be assured, the length of blades 49 must be adjusted so that at least the plants of the crop sampled are not contacted by the blades 49. This is accomplished by adjusting the length of blades 49 to be at least just less than the distance between successive groups of plants contacted by probes 39. Preferably however, the length of each of the blades 49 is adjusted to be equal to or less than one-half the distance between plants of successive groups to be contacted by probes 39. The blades 49 are positioned so that the ends thereof proximate blades 48 allow clearance for relative movement between blades 49 and 48.

The blades 48 and 49 are translated for plant extraction by pneumatically operated pistons 51 mounted to a piston support member 52. The piston support member 52 is mounted to the spaced members 34 and 36 preferably at forty-five degrees relative thereto. The rod 53 of each piston 51 is connected to the remaining arm 54 of bell crank lever. Hydraulically and mechanically operated pistons also can be used to translate blades 48 and 49. However, where a pneumatically operated piston is employed, a manifold 56 is mounted to assembly 33 to distribute air under pressure to pistons 51 via conduits 57. To selectively control the flow of air to pistons 51, a solenoidally controlled normally closed valve 58 is serially interposed each piston 51 and manifold 56. The air is supplied to manifold 56 by a main conduit 59 from an air compressor unit 61 mounted on fixed frame 32.

In those cases where vegetable crops, such as lettuce, are to be thinned, two assemblies 33 are mounted to each mobile carriage to be translated through a defined path relative to the crop bed. The assemblies are mounted to each carriage with the working surface of the blades 48 and 49 of the respective assemblies facing away from one another. In order to facilitate imparting cycloidic motion to the probes 39 of each assembly, each assembly 33 is journally coupled to two synchronously driven crank arms 62 or other suitable means such as cams for rotating the assembly 33 along a vertically oriented circular path. The assembly 33 is coupled to the crank arms 62 by crank pins 63 in journal with bearings contained in bearing boxes 65 fastened at spaced locations to main support member 37. The probes 39 can be moved through other paths than vertically oriented circular paths to accomplish momentary contacting of the plants. Such paths could be a straight line or any closed curve. Furthermore, the path through which the probes 39 are moved can be oriented vertically, horizontally, or at any angle therebetween. However, because of its simplicity and characteristic advantages set forth hereinbefore, a vertically oriented circular path is preferred.

The crank arms 62 are revolved by means of a link chain drive mechanism connected to rotate drive shafts 70 secured to the ends of the crank arms 62, distal crank pins 63 and thereby provide the desired rotary motion of each assembly 33. More particularly, the drive shafts 70 are coupled for movement together by a continuous link chain 67 which passes about sprockets 64 and 66 on the two drive shafts 70. As best depicted in FIGURE 2, a single drive shaft 70 is used to translate two assemblies 33 on each carriage. Thus, the two assemblies will be driven synchronously. One of the drive shafts 70 is provided with a driven sprocket 68. This driven sprocket 68 may be driven by any suitable prime mover. However, in order to have the capability of contacting the plants at regularly spaced intervals, it is necessary that the prime mover be synchronized to the speed of advance of the carriages.

An inexpensive and carriage advance synchronized prime mover is a ground drive wheel. In the apparatus of the present invention, a ground drive wheel 71 is employed which includes a wheel 72 having a plurality of blades 73 circumferentially spaced thereabout. The blades 73 are mounted to the wheel 72 to extend radially outward therefrom. The ground drive wheel 71 is pivotally mounted to the I-shaped frame 13 to thereby render the drive wheel blades 73 in ground engaging relation for all elevation positions of frame 13. The ground drive wheel 71 is coupled to driven sprocket 68 on one of the drive rods 70 by a link chain drive which includes a drive sprocket 74 on the ground drive wheel 72 coupled to a driven sprocket 76 by a link chain 77. A follower sprocket 78 is mounted for rotation with the sprocket 76 and is coupled to the driven sprocket 68 on one of the drive rods 70 by a link chain 79. The sprocket wheel radius of the various sprockets are adjusted so that for a given speed of carriage advance, the angular velocity of the probes 39 will be equal to the speed of advance divided by the radius of the circular path followed by the probes. Thus, the probes and the removal blades will follow the cycloidal path shown in FIGURE 6.

A typical application of the crop thinning embodiment of the present invention illustrated in the figures is for thinning of young lettuce plants of a crop. It is common practice to plant two rows of lettuce spaced apart 13 inches in raised beds six inches high which are spaced parallelly apart 40 inches. For such an application, the spacing between the carriages, assemblies 33 mounted thereon, the wheels 19 of each carriage, and the elevation of the I-shaped frames 13 would be adjusted accordingly to bring the probe tips into momentary point contact with the plants 38 when the assembly 33 to which it is mounted is at the lowest point of its circular path.

For balancing and insuring sufficient clearance between assemblies mounted to the carriage, the crank arms 62 associated with each assembly are mounted to the drive shafts 70 so that one assembly is at its uppermost point while the other assembly mounted to the same connecting rod 70 is at its lowermost.

Although the apparatus of the present invention has been described with reference to a particular assembly 33 and a particular manner of mounting the assemblies to a carriage, it is not to be considered limiting. For example a single assembly 33 could be adapted to be mounted to a carriage. Furthermore, the probes 39 and piston operated blades 48 and 49 could be mounted longitudinally spaced apart on the carriage. Of course in that case a suitable time delay between plant contact and the initiation of plant extraction would be required to compensate for the positioning of the blades for proper plant extraction.

The probes 39 could even be mounted parallel to the crop bed and translated through a horizontally oriented circular path. Moreover, a plurality of assemblies could be mounted to a carriage in staggered relationship to one another. Hence, it is seen that there are many possible variations in particular configuration of the apparatus of the present invention.

Figure 5:
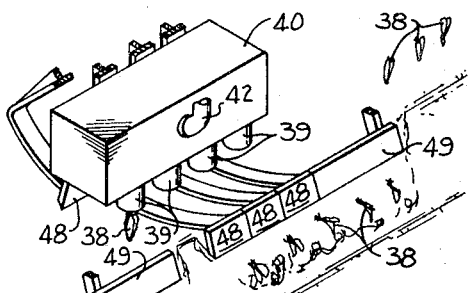
FIGURE 5 is a perspective view illustrating the manner in which the plants are extracted from the crop.

Referring now in particular to FIGURES 5–7, the operation of the apparatus of the present invention utilizing a control circuit responsive to the initial plant contact, or in other words, the largest plant of the group sampled, will be described. The carriages 11 and 12 are drawn, for example, by a tractor coupled to fixed frame 32 and represented by tractor wheels 81 in FIGURES 1 and 2. As the carriages are advanced over plants 38 along a path represented by arrows 82, conductive type probes 39 of, for example, an assembly 33 mounted to carriage 12 are driven by ground drive wheels 72 to follow a cyloidic path represented by broken line 83. As the conductive probes are directed to pass through the lowest point of their path, the largest plant of the group being sampled will be contacted by a probe first. Each conductive probe 39 is electrically coupled by cable 42 to a signal generating means 84 contained in chassis container 43 and which responds to the plant contact by generating an output signal indicative of a plant contact. A variable biased amplifier 86 would provide such an output signal. Where such a biased amplifier 86 is employed, the grid 87 of tube 88 is referenced through grid resistor 89 and bias battery 91 to the ground plane, and the conductive probe is connected directly to grid 87. As a plant is contacted by a probe 39, a conductive path is established between grid 87 and bias battery 91 through the plant's resistance, represented by resistor 120. The connecting of the plant's resistance in circuit with the input of amplifier 86 causes the current flow through the amplifier to change, hence an output signal generated. The output signal generated by each signal generating means 84 is transformerly coupled to circuit 92 contained in chassis container 43 which responds to the first signal received from the signal generating means 84, i.e., the signal generated when the first plant contact is made by the probes, by allowing an inhibiting signal to be transmitted from signals generating means 84 to prevent the valve opening of the solenoidally controlled valve 58 associated with piston 51 which is operatively associated with the probe 39 which contacted the largest plant.

The exclusive "or" circuit 92 is a digital system which is most suitable for use in those cases as described supra where plants are selected according to their size. However, as noted hereinbefore, the resistance of the plants could be compared to determine which plants of a sample are of superior quality. In such a comparison system, an analog control circuit would be used, such as a pulse height analyzer circuit, in place of the exclusive "or" circuit 92 to compare the amplitude of the signals generated by the amplifiers of the signal generating means 84. Where the plant's resistance is used as a measure of its quality, the one with the largest leaf area would be the one with the lowest resistance. The pulse height analyzer would respond to the comparison by generating an inhibiting signal to prevent the valve opening in the same manner as in the case where the exclusive "or" circuit 92 is employed.

To synchronously initiate plant extraction, a rotary limit switching means 93 is mounted to the I-shaped frame 13 and a link chain follower sprocket 94 thereon is in engagement with the chain 67 which couples the sprockets of said idler sprockets 64 and 66. Thus, the rotational motion of the assemblies 33 is fed to the rotary limit switch. Contacts for each assembly 33 driven by one drive shaft 70 are contained within the one rotary limit switching means 93. The rotary switch is adjusted to automatically initiate a switch closure just after the plants have been contacted. The switch closure couples a power source 90 mounted to fixed frame 32 through one conductor of a multiconductor cable 95, through chassis container 43 and rotary limit switch contacts and cables 96 to excite the solenoid of valves 58 to initiate a valve opening. The inhibiting of the valve opening is accomplished by inserting a normally closed switch, which responds to the inhibiting signal by opening, in series with each cable connecting a rotary limit switch contact with a solenoid of a valve 58. The normally closed switch is mounted in chassis container 43. To provide circuit resetting, a second set of rotatory contacts are provided in the rotary limit switch means 93 to couple a reset signal by a second conductor of multiconductor cable 95 to the "or" circuit 92 and to clear a memory 105 where it is employed to provide a long time delay between plant contact and plant extraction. The result of the control circuit's operation can be seen in FIGURE 5. Three probe associated blades 48 have been actuated with blades 49 to effect extraction of plants 38 while one probe associated blade 48 has been prevented from extracting plants.

Generally, the surface of the crop beds are uneven and undulatory. In order to maintain probes 39 at the most desirable elevation for plant contact, a skid 97 is mounted to cross member 17 centrally between wheels 19 to ride on the surface of the ground proximate the plants 38 as the carriage is advanced. The skid is mounted by a U-shaped grip 28, thereby providing means for adjusting the distance between the skid 97 and I-shaped frame 13. To render the I-shaped frame 13 adjustable in elevation in accordance with the undulations in the surface of the bed, the ground wheels 19 are pivotally connected to the suspension bar 22 by a lever arm 98. A spring position control piston 99 of the class wherein a piston's position is determined by oppositely acting springs is mounted between the lever arm 98 and I-shaped frame 13. Hence, as the skid 97 encounters higher ground, the carriage is lifted and the pistons 99 force the wheels 19 to the ground. When the skid 97 passes over indentations in the surface, it no longer supports any of the carriage's weight. Hence, the extra weight pistons 99 will allow the I-shaped frame 13 to be lowered until the skid 97 engages the surface of the ground. Although a skid is a most convenient way of maintaining the desired elevation between probes 39 and plants 38, other means could be employed to follow the contour of the surface of the ground proximate the plants, for example, a wheel.

To carry the carriages when not in use, an upright member 100, extending vertically from cross member 18, is connected to a piston rod 101 of an elevating cylinder 102 mounted to fixed frame 32.

What is claimed is:

1. Apparatus for extracting selected plants from a crop comprising a mobile carriage, a first plant sensing means including a probe adapted for movement through a first defined path to contact a plant of said crop mounted to said carriage for generating a signal representative of the quality of the plant contacted by said probe, said probe positioned to contact a plant of said crop when at a selected location of said defined path, drive means coupled to move said probe as said carriage is advanced, a first plant extracting means responsive to selected signals generated by said plant sensing means to extract selected plants contacted.

2. The apparatus according to claim 1 wherein said drive means is coupled to move said probe along a circular path in a plane generally parallel to the direction said carriage is arranged to advance.

3. The apparatus according to claim 2 wherein said carriage is adapted to be advanced at a selected speed, and said drive means is coupled to move said probe along a vertically oriented circular path at an angular velocity generally equal to the product of the radius of the circular path defined by the plant contacting end of said probe and the speed of advance of said carriage.

4. The apparatus according to claim 1 wherein said sensing means includes a plurality of spaced apart probes, each probe initiating the generation of a signal by said plant sensing means representative of the quality of the contacted plant, and said plant extracting means including a trowel means associated with each probe and responsive to selected signals initiated thereby to extract said plant contacted by said associated probe.

5. The apparatus according to claim 4 further comprising means for operatively coupling said plant extracting means to said probes to automatically initiate plant extraction by said associated trowels subsequent to plant contact, and comparator means coupled to receive and compare said signals representative of the quality of said contacted plants and generate an extraction inhibiting signal in response to the superior quality signal, said plant extracting means coupled to receive said extraction inhibiting signal and respond thereto by preventing plant extraction by said trowel means associated with said probe contacting said plant of superior quality.

6. The apparatus according to claim 4 further comprising means for maintaining said probes and trowel means at a selected constant elevation above the surface of the ground proximate said mobile carriage.

7. The apparatus according to claim 6 wherein said elevation maintaining means includes a surface contour following means, a vertically adjustable support means for said probes and trowel means, and means for translating vertical movements of the surface contour following means to corresponding vertical adjustments in the position of said support means.

8. The apparatus according to claim 4 further comprising a second plant sensing means including a plurality of spaced apart probes adapted for simultaneous movement through a second defined path as said carriage is advanced to contact plants of said crop for generating signals representative of the quality of the plants contacted by said probes, a second plant extracting means including a trowel means associated with each probe of said second plant sensing means and responsive to selected signals initiated thereby to extract said plant contacted by said associated probe, said probes of said second plant sensing means mounted to said mobile carriage at side thereof laterally opposite said probes of said first plant sensing means and positioned to contact plants of said crop when at a selected location of said second defined path.

9. The apparatus according to claim 8 further comprising coupling means mounted to said mobile carriage for connecting additional mobile carriages thereto.

10. The apparatus according to claim 8 wherein said carriage is adapted to be advanced at a selected speed, and said second drive means is coupled to move said probes of said second plant sensing means along a vertically oriented circular path of a fixed radius at an angular velocity generally equal to the product of the radius of the circular path defined by the plant contacting end of said probe and the speed of advance of said carriage, said probes of said second plant sensing means coupled to be translated by said drive means.

11. The apparatus according to claim 10 further defined by said first and second plant sensing means generating signals in response to plant contact, each probe having a conductive plant contact end electrically isolated from the others, and including comparator means responsive to the signal generated by the first plant contact occurring each time the probes are translated through said path to generate an extracting inhibiting signal, and including means for operatively coupling said plant extracting means to said probes to automatically initiate plant extraction by said associated trowels subsequent to plant contact, said associated plant extracting means coupled to receive said extraction inhibiting signal and respond thereto by preventing plant extraction by said trowel means associated with said probe effecting first plant contact.

12. The apparatus according to claim 10 wherein each probe includes a conductive tip electrically coupled to said plant sensing means, said plant sensing means responsive to input impedance variations, and further comprising means for operatively coupling said plant extracting means to said associated probes to automatically initiate plant extraction by said trowels subsequent to plant contact, and comparator means associated with said plant sensing means coupled to receive and compare said signals from said associated plant sensing means and generate an extraction inhibiting signal in response to a signal generated by said plant sensing means representative of the smallest input impedance, said associated plant extracting means coupled to receive said extraction inhibiting signal and respond thereto by preventing plant extraction by said trowel means associated with said probe contacting the plant of lowest impedance.

13. The apparatus according to claim 9 further comprising supplementary trowel means mounted spaced apart on either side of said trowel means of said plant extraction means, said supplementary trowel means operatively coupled to extract plants when at least one of the trowel means of said plant extraction means is operated.

14. Apparatus for thinning crops planted in spaced rows comprising a plurality of mobile carriages fixed together in spaced apart relation in accordance with the row spacing of the crop to be thinned, each mobile carriage including a support member pivotally mounted at a first end thereof to provide vertical adjustment for said support member, wheel means pivotally mounted to said support member at an end thereof opposite said first end, a skid secured to said support member at a fixed distance therebelow to maintain said support member at said fixed distance above the surface of the ground, means to maintain said wheel means on the ground as said support member is caused to move vertically by said skid, each mobile carriage provided with a first and second set of spaced apart probes, the probes of each set fixed together and having plant contact ends in a horizontal plane, said sets mounted spaced apart at opposite sides of said support member, means coupled to each set of probes to move said set of probes in a vertically oriented circular path, a drive wheel having protruding members about its circumference pivotally mounted to said support member to engage said protruding members with the ground, said wheel driven as said carriage is advanced, rotational drive coupling means for coupling said probe movement means associated with each set of probes to be rotated by said driven wheel, a piston actuated trowel associated with each probe, said trowel pivotally mounted to said support member to engage plants of said crop when actuated by said piston, signal generating means associated with each probe for generating an output signal in response to a plant contact by said associated probe, comparator means electrical coupled to receive and compare said output signals from the signal generating means associated with one set of probes and respond thereto by generating an extraction inhibiting signal, and a mechanical timer operatively coupling said pistons and associated set of probes to automatically actuate said pistons subsequent to plant contact, said comparator means coupled to deliver extraction inhibiting signals to prevent said automatic piston actuation.

15. A plant sensing and extracting assembly for automated crop thinners comprising a frame including at least two spaced apart members extending from a main support member, a pivot rod mounted to said spaced apart members to extend therebetween, a plurality of spaced apart probes vertically mounted between said spaced apart members at the extend ends thereof, a plurality of first angled arms like in number to said plurality of probes journally mounted at spaced locations to said pivot rod between said spaced members to extend around said probes, second and third angled arms each journally mounted to said pivot rod to extend to the same horizontal plane as said first angled arms, said second and third angled arms mounted at opposite ends of said pivot rod, a blade mounted to the end of each of said arms distal said journaled end, a piston support rack mounted to said frame, and means for coupling said frame to a mechanical drive system.

16. The apparatus according to claim 15 wherein said piston support rack is mounted to said frame at a side thereof opposite said blades to support pistons at a forty-five degree angle relative to said spaced apart members.

17. A method of selecting plants of a growing crop comprising the steps of substantially simultaneously contacting plants in a selected group of a row of said crop to generate for each of the plants contacted a signal representative of the quality of said plant, comparing the signals generated for the plants of said selected group with one another and extracting from said row a portion of said group of plants selected by a quality standard determined for said group by said signal comparison.

18. The method according to claim 17 wherein said plants are physically contacted with plant quality sensing means and comprising the additional steps of advancing said sensing means along said row while simultaneously moving said sensing means through a circular path in a plane generally parallel to the direction of advancement of said sensing means to impart to said sensing means a cycloidal motion, and contacting successive groups of said plants with said sensing means when said sensing means is in a selected location of said defined path at which the direction of movement of said sensing means in said circular path has a component of direction opposite to the direction of advancement thereof along said row.

19. The method according to claim 17 wherein the plants extracted from said group in response to said signal comparison are those of a quality inferior to that of the superior plant of the group.

20. The method according to claim 17 wherein said plants are contacted with plant height sensing means, and said signal generated in response to said plant contact is representative of the height of the plant.

21. The method according to claim 17 wherein said plants are contacted with resistance sensing means, and said signal generated in response to said plant contact is representative of the electrical resistance of said plant.

22. The method according to claim 17 wherein said plants are contacted with capacitance sensing means, and said signal generated in response to said plant contact is representative of the electrical capacitance of said plant.

23. The method according to claim 17 wherein groups of plants at regular intervals are contacted.

24. The method according to claim 23 wherein all plants between the superior plants of successive groups of plants are extracted.

References Cited

UNITED STATES PATENTS

| | | | |
|---|---|---|---|
| 2,400,562 | 5/1946 | Marihart | 172—6 |
| 2,433,856 | 1/1948 | Marihart | 172—6 X |
| 2,681,606 | 6/1954 | Richey | 172—6 X |
| 3,021,477 | 2/1962 | Robinson | 47—1.3 X |
| 3,233,681 | 2/1966 | Ferte | 172—6 |
| 3,358,775 | 12/1967 | Garrett | 172—6 |

ABRAHAM G. STONE, *Primary Examiner.*

J. R. OAKES, *Assistant Examiner.*

U.S. Cl. X.R.

172—6